(12) United States Patent
Cohen

(10) Patent No.: US 8,872,439 B2
(45) Date of Patent: Oct. 28, 2014

(54) SYSTEM AND METHODS FOR PROVIDING EQUAL CURRENTS TO CURRENT DRIVEN LOADS

(75) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 804 days.

(21) Appl. No.: 12/882,706

(22) Filed: Sep. 15, 2010

(65) Prior Publication Data

US 2011/0266970 A1 Nov. 3, 2011

Related U.S. Application Data

(60) Provisional application No. 61/330,155, filed on Apr. 30, 2010.

(51) Int. Cl.
H05B 41/16 (2006.01)
(52) U.S. Cl.
USPC ........ 315/278; 315/247; 315/185 S; 315/312; 315/291
(58) Field of Classification Search
USPC .............. 315/247, 224, 185 S, 274–289, 291, 315/307–326
See application file for complete search history.

(56) References Cited

U.S. PATENT DOCUMENTS

| | | | |
|---|---|---|---|
| 4,881,014 A * | 11/1989 | Okochi | 315/246 |
| 6,300,878 B1 | 10/2001 | Galloway et al. | |
| 7,683,555 B2 * | 3/2010 | Hiramatsu | 315/255 |
| 8,058,809 B2 * | 11/2011 | Li et al. | 315/209 R |
| 8,080,947 B2 * | 12/2011 | Chang et al. | 315/282 |
| 8,183,795 B2 * | 5/2012 | Huang et al. | 315/294 |
| 2005/0162098 A1 | 7/2005 | Ball | |
| 2006/0284569 A1 | 12/2006 | Wey et al. | |
| 2007/0139317 A1 | 6/2007 | Martel et al. | |
| 2007/0236159 A1 | 10/2007 | Beland | |
| 2008/0054815 A1 | 3/2008 | Kotikalapoodi et al. | |
| 2009/0039795 A1 * | 2/2009 | Ashikaga | 315/209 R |
| 2010/0052568 A1 | 3/2010 | Cohen | |

FOREIGN PATENT DOCUMENTS

| | | |
|---|---|---|
| CN | 1426270 | 6/2003 |
| CN | 201131071 | 10/2008 |
| CN | 101647318 | 5/2012 |

OTHER PUBLICATIONS

PCT Search Report mailed Jan. 11, 2012.
English transiation of Chinese Office Action (201180019651.X) dated Feb. 13, 2014.
English Machine Translation for CN CN101647318.
English Machine Translation for CN1426270.
English Machine Translation for CN201131071.

* cited by examiner

Primary Examiner — Tuyet Thi Vo
(74) Attorney, Agent, or Firm — William B. Kempler; Frederick J. Telecky, Jr.

(57) ABSTRACT

Systems and methods are provided for providing a substantially constant and equal current to a plurality of current driven loads. In one embodiment, a system is provided that comprises a plurality of current regulated outputs and a plurality of current driven loads. The plurality of current regulated outputs and the plurality of current driven loads are arranged in a single current loop configuration with a respective current regulated output providing an output voltage to a respective current driven load of the plurality of current driven loads.

18 Claims, 8 Drawing Sheets

SYSTEM AND METHODS FOR PROVIDING EQUAL CURRENTS TO CURRENT DRIVEN LOADS

RELATED APPLICATIONS

The present invention claims priority from U.S. Provisional Patent Application No. 61/330,155, filed 30 Apr. 2010.

TECHNICAL FIELD

This invention relates to electronics, and more specifically to systems and methods for providing equal currents to current driven loads.

BACKGROUND

In high power light emitting diode (LED) lighting applications, it is necessary to drive multiple LEDs with substantially equal current. This can be accomplished by connecting all of the LEDs in series. However, based on the number of LEDs in a given application, this type of configuration can result in excessively high voltages. For example, thirty series connected LEDs may develop a voltage in excess of 100 volts. One solution to mitigate the utilization of excessively high voltages is to divide the LEDs into groups of LED strings consisting of a number of series connected LEDs, such that each LED string will develop a safe voltage when driven with a required current. For example, the 30 LEDs mentioned above may be divided into three strings of 10 LEDs with a voltage of about 34 volts per string.

To facilitate current regulation across the groups of LED strings, each LED string can be connected to a common low voltage source with each LED string being regulated by a respective linear or switching current regulator. However, this solution is expensive because of the added regulators and the current balance of the strings is less than perfect due to the tolerances and offsets associated with separate current loops. Furthermore, the added regulators will reduce the system efficiency and may produce additional electromagnetic interference (EMI) that will contribute to further increased costs and increased efficiency erosion.

SUMMARY

In one aspect of the invention, a system is provided that comprises a plurality of current regulated outputs and a plurality of current driven loads. The plurality of current regulated outputs and the plurality of current driven loads are arranged in a single current loop configuration with a respective current regulated output providing an output voltage to a respective current driven load of the plurality of current driven loads.

In another aspect of the invention, a system provides a substantially constant and equal current to a plurality of current driven loads. The system comprises a single multiple output current regulated converter that provides a plurality of current regulated outputs. The system further comprises a plurality of light emitting diode (LED) strings arranged in a single current loop configuration with the plurality of current regulated outputs with a respective current regulated output providing an output voltage to a respective LED string of the plurality of LED strings.

In yet another aspect of the invention, a method provides a substantially constant and equal current to a plurality of current driven loads. The method comprises a providing a single multiple output current regulated converter that provides a plurality of current regulated outputs, providing a plurality of light LED strings and arranging the plurality of current regulated outputs and the plurality of LED strings in a single current loop configuration with a respective current regulated output providing an output voltage to a respective LED string.

DETAILED DESCRIPTION

The present invention relates to systems and methods for providing a substantially constant and equal current to a plurality of current driven loads. The plurality of current driven loads are arranged in a single current loop configuration with a plurality of current regulated outputs, such that a respective current regulated output provides an output voltage to a respective current driven load. The single current loop configuration assures that each of the current driven loads is provided with a substantially constant and equal current and a substantially reduced voltage compared to a configuration in which a single regulated output drives the plurality of current driven loads.

The following examples will be illustrated with the current driven loads being light emitting diode (LED) strings. However, it is to be appreciated that the present invention can be employed with a variety of different current driven loads.

Figure 1:
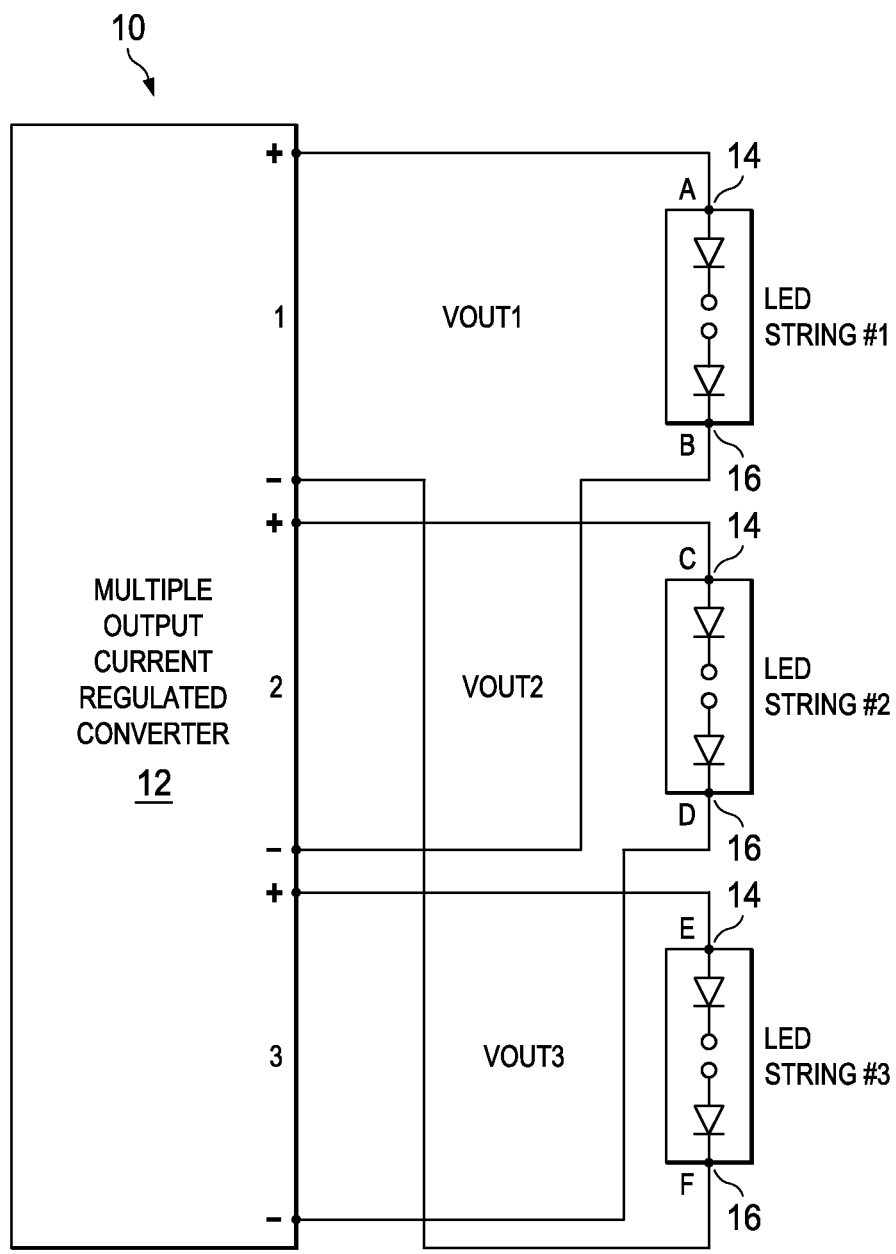
FIG. 1 illustrates a representative schematic of a system for providing a substantially constant and equal current to a plurality of current driven loads in accordance with an aspect of the present invention.

FIG. 1 illustrates a representative schematic of a system 10 for providing a substantially constant and equal current to a plurality of current driven loads in accordance with an aspect of the present invention. The system 10 comprises a multiple output current regulated converter 12 that provides a first current regulated output (1), a second current regulated output (2) and a third current regulated output (3). It is to be appreciated that any single or double ended multi-output converter topology could be employed to provide multiple current regulated outputs. Additionally, separate converters could be employed to provide multiple current regulated outputs. The first current regulated output (1) provides a first output voltage (VOUT1) to a first LED string (LED STRING #1), the second current regulated output (2) provides a second output voltage (VOUT2) to a second LED string (LED STRING #2) and the third current regulated output (3) provides a third output voltage VOUT3 to a third LED string (LED STRING #3). The first, second and third output voltages (VOUT1-VOUT3) can be selected to be substantially the same voltage or different voltages with the only limitation being that the difference in voltages is low enough to assure that the voltage difference between any two points (A-F) in the system 10 does not exceed a specified maximum value.

The first, second and third current regulated outputs are arranged in a single current loop configuration with the first, the second and the third LED strings, such that a substantially constant and equal current is provided to each of the first, the second and the third LED strings. The positive terminal of the first current regulated output (1) is coupled to an anode end (14) of the first LED string and a cathode end (16) of the first LED string is coupled to a negative terminal of the second regulated output (1). Additionally, the positive terminal of the second regulated output (2) is coupled to an anode end (14) of the second LED string and a cathode end (16) of the second LED string is coupled to a negative terminal of the third regulated output (3). The positive terminal of the third regulated output (3) is coupled to an anode end (14) of the third LED string and a cathode end (16) of the third LED string is coupled to a negative terminal of the first current regulated output (1) to complete the single current loop configuration.

Figure 2:
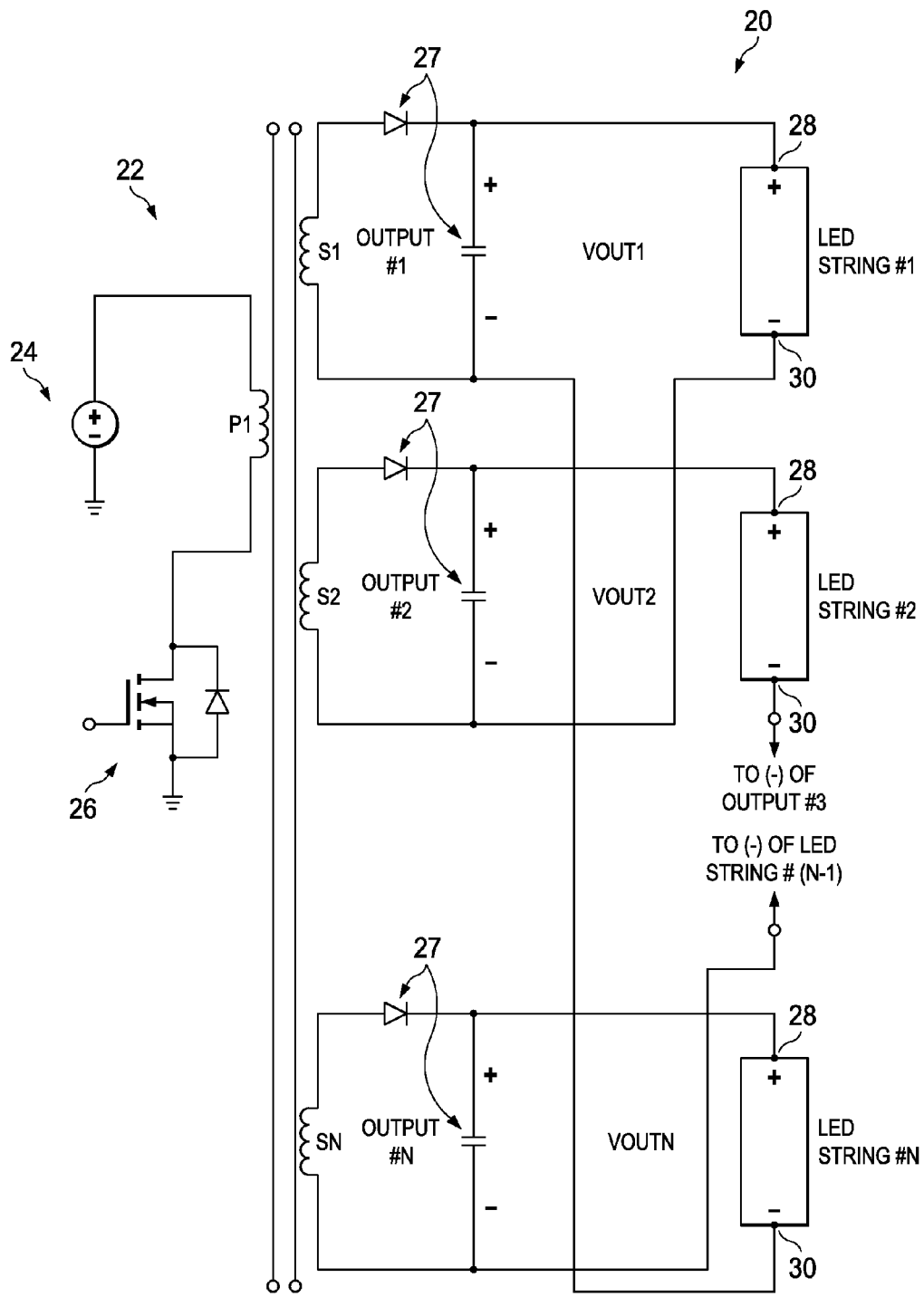
FIG. 2 illustrates a representative schematic of a system that employs a single ended converter for providing a substantially constant and equal current to a plurality of LED strings in accordance with an aspect of the present invention.

FIG. 2 illustrates a representative schematic of a system 20 that employs a single ended converter 22 for providing a substantially constant and equal current to a plurality of LED strings in accordance with an aspect of the present invention. The single end converter 22 is a multiple output current regulated flyback converter that includes a primary winding (P1) coupled between a voltage source 24 and a switching device 26 to provide an AC voltage and an AC regulated current to the primary winding (P1). The primary winding (P1) drives N secondary windings (S1-SN), where N is an integer greater than one. Each of the N secondary windings (S1-SN) is coupled to a respective diode and capacitor configuration 27 to provide a DC voltage and DC regulated current to a respective LED string of N LED strings (LED STRING #1-LED STRING #N). It is to be appreciated that the since the single ended converter 22 provides half wave rectification, the single ended converter 22 delivers current simultaneously to all of the current regulated outputs. Therefore, the number of current regulated outputs can be odd or even.

A first current regulated output (OUTPUT #1) provides a first output voltage (VOUT1) to a first LED string (LED STRING #1), a second current regulated output (OUTPUT #2) provides a second output voltage (VOUT2) to a second LED string (LED STRING #2), which is repeated such that an Nth current regulated output (OUTPUT #N) provides an Nth output voltage (VOUTN) to an Nth LED string (LED STRING #N). Each of the N output voltages can be selected to be substantially the same voltage or different voltages. The N regulated outputs are arranged in a series connected current loop configuration, such that a substantially equal current is provided to each of the N LED strings. The positive terminal of the first regulated output (OUTPUT #1) is coupled to an anode end (28) of the first LED string and a cathode end (30) of the first LED string is coupled to a negative terminal of the second regulated output (OUTPUT #2). Additionally, the positive terminal of the second regulated output (OUTPUT #2) is coupled to an anode end (28) of the second LED string and a cathode end (30) of the second LED string is coupled to a negative terminal of the next regulated output, while the negative terminal of the Nth regulated output (OUTPUT #N) is coupled to an anode end of the N−1 LED string. The positive terminal of the Nth regulated output (OUTPUT #N) is coupled to an anode end 28 of the Nth LED string and a cathode end 30 of the Nth LED string is coupled to a negative terminal of the first regulated output (OUTPUT #1) to complete the single current loop configuration.

Figure 3:
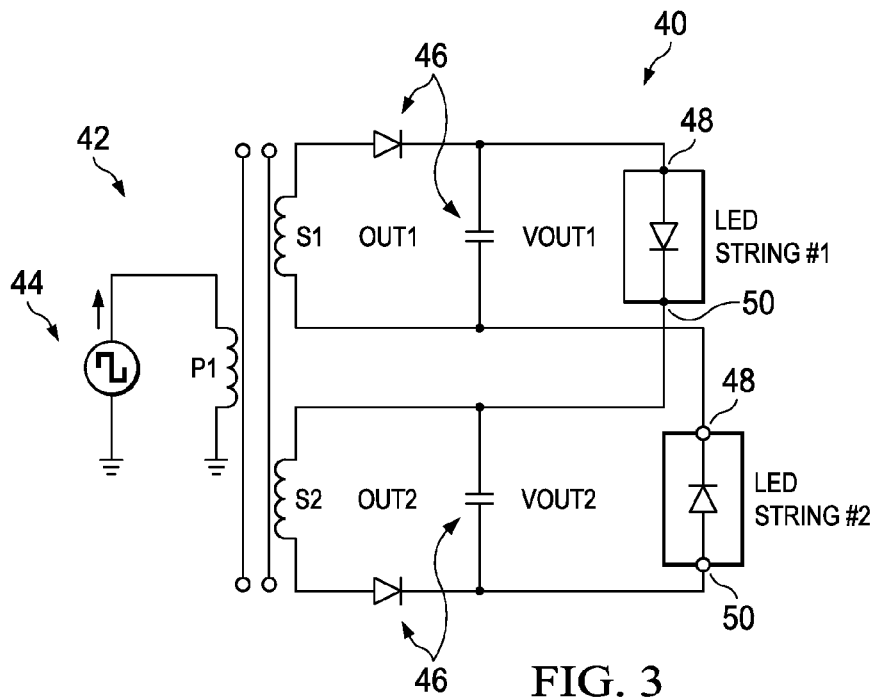
FIG. 3 illustrates a representative schematic of a system that employs a double ended converter for providing a substantially constant and equal current to a plurality of LED strings in accordance with an aspect of the present invention.

It is to be appreciated that since the currents supplied by the all the outputs are equal, it is possible to provide half wave rectification employing the outputs of double ended converters. FIG. 3 illustrates a representative schematic of a system 40 that employs a double ended converter 42 for providing a substantially constant and equal current to a plurality of LED strings in accordance with an aspect of the present invention. The double ended converter 42 is a two output current regulated converter that includes a primary winding (P1) coupled to a voltage source 44 to provide an AC voltage and an AC regulated current to the primary winding (P1). The primary winding (P1) drives a first secondary winding (S1) and a second secondary winding (S2) with each of the secondary windings being coupled to a respective diode and capacitor configuration 46 to provide a DC voltage (VOUT1 and VOUT2) and DC regulated current to a first LED string (LED STRING #1) and a second LED string (LED STRING #2), respectively. It is to be appreciated that the double ended converter 42 delivers current to the first LED string during the negative half of the input voltage and to the second LED string during the positive half of the input voltage. If a third output is added (or any odd number of outputs), the primary current of the transformer will become asymmetrical causing a DC bias in the transformer which is unacceptable in double ended converters.

A first current regulated output (OUT1) provides the first output voltage (VOUT1) to the first LED string and a second current regulated output (OUT2) provides the second output voltage (VOUT2) to the second LED string. The first and second current regulated outputs and the first and second LED strings are arranged in a single current loop configuration, such that a substantially constant and equal current is provided to both the first and second LED strings. The positive terminal of the first regulated output (OUT1) is coupled to an anode end 48 of the first LED string and a cathode end 50 of the first LED string is coupled to a negative terminal of the second regulated output (OUT2). Additionally, the positive terminal of the second regulated output (OUT2) is coupled to an anode end 48 of the second LED string and a cathode end 50 of the second LED string is coupled to a negative terminal of the first regulated output (OUT1) to complete the single current loop configuration.

Figure 4:
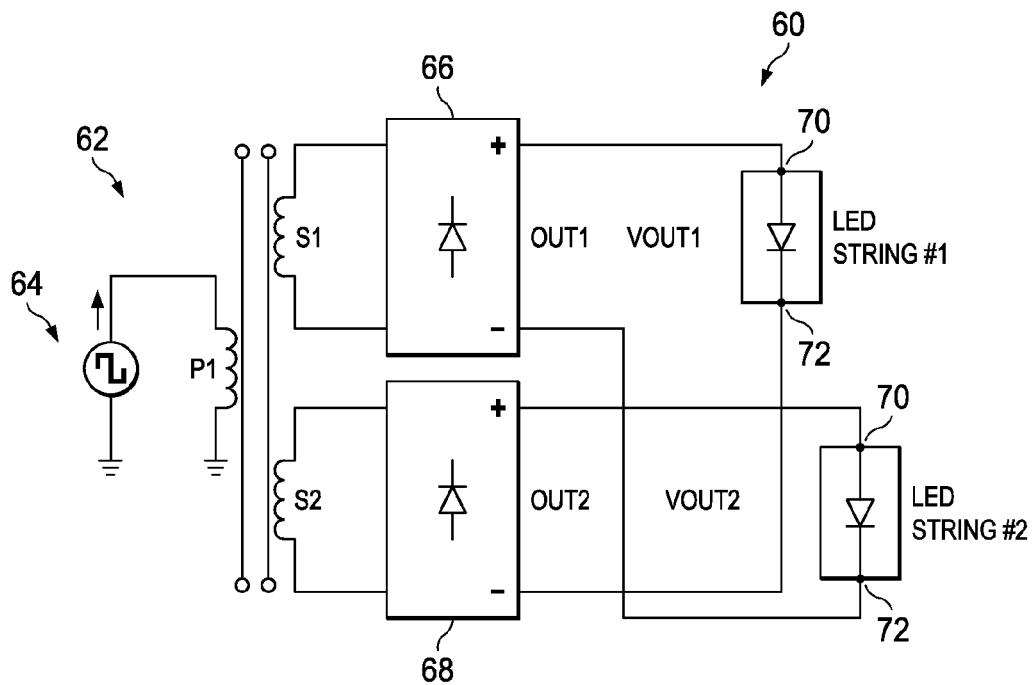
FIG. 4 illustrates a representative schematic of a system that employs a double ended converter configured to provide full wave rectification for providing a substantially constant and equal current to a plurality of LED strings in accordance with an aspect of the present invention.

FIG. 4 illustrates a representative schematic of a system 60 that employs a double ended converter 62 configured to provide full wave rectification for providing a substantially constant and equal current to a plurality of LED strings in accordance with an aspect of the present invention. The double ended converter 62 is a two output current regulated converter that includes a primary winding (P1) coupled to a voltage source 64 to provide an AC voltage and an AC regulated current to the primary winding (P1). The primary winding (P1) drives a first secondary winding (S1) and a second secondary winding (S2) similar to the configuration illustrated in FIG. 3. However, each of the diode and capacitor arrangements 46 of FIG. 3 have been replaced with full wave bridge rectifiers. In this configuration, the system 60 can deliver power simultaneously to both (or N number) outputs similarly to a single ended converter such that an odd number of outputs will not cause DC biasing of the transformer allowing both even and odd numbers of outputs to be employed.

As illustrated in FIG. 4, a first current regulated output (OUT1) is provided at an output of a first full wave bridge rectifier 66 to provide a first output voltage (VOUT1) to a first LED string (LED STRING #1) and a second current regulated output (OUT2) is provided at an output of a second full wave bridge 68 rectifier to provide a second output voltage (VOUT2) to the second LED string (LED STRING #2). The positive terminal of the first full wave bridge rectifier 66 is coupled to an anode end 70 of the first LED string and a cathode end 72 of the first LED string is coupled to a negative terminal of the second full wave bridge rectifier 68. Additionally, the positive terminal of the second full wave bridge rectifier 68 is coupled to an anode end 70 of the second LED string and a cathode end 72 of the second LED string is coupled to a negative terminal of the first full wave bridge rectifier 66 to provide a single current loop configuration.

Figure 5:
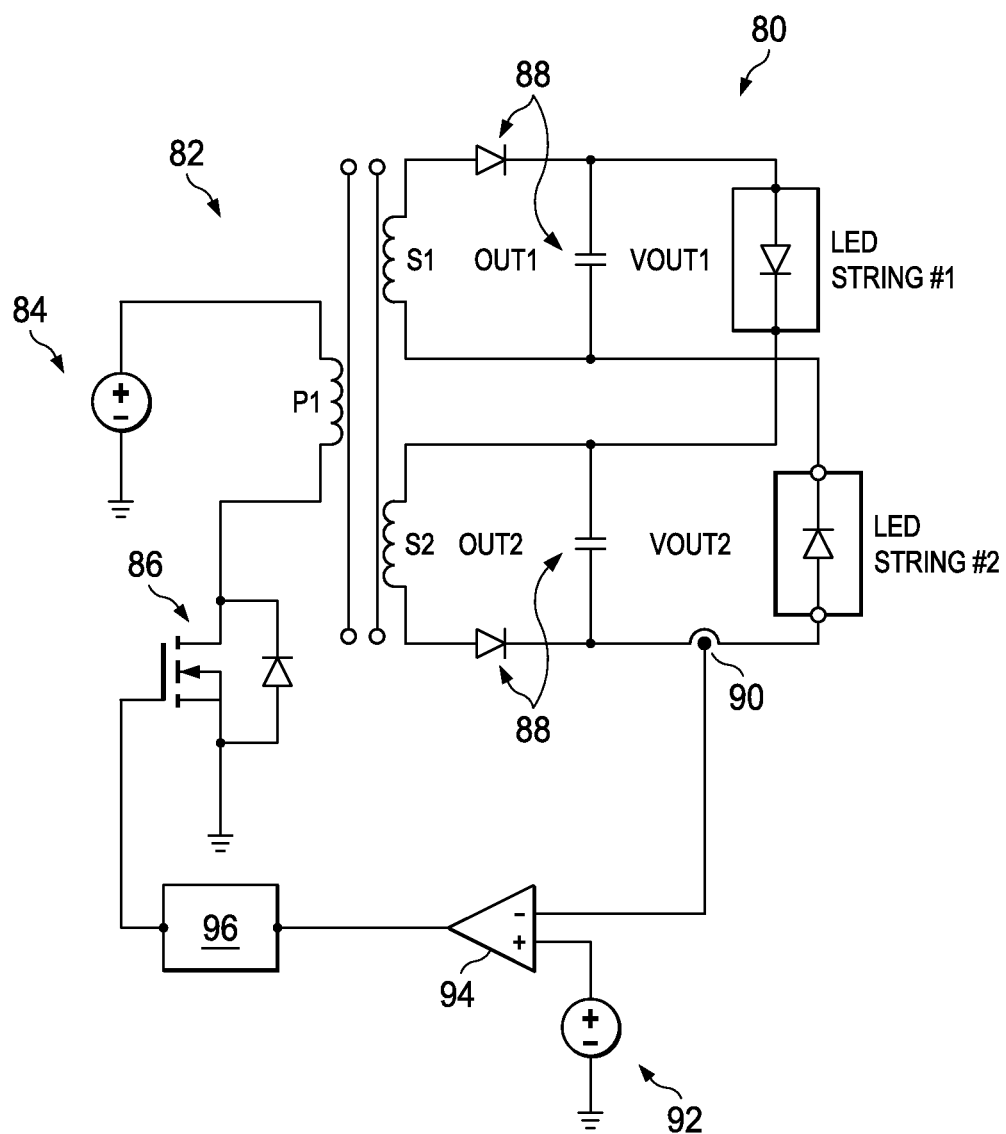
FIG. 5 illustrates a representative schematic of a system that employs a single ended flyback converter with direct current regulation for providing a substantially constant and equal current to a plurality of LED strings in accordance with an aspect of the present invention.
Figure 6:
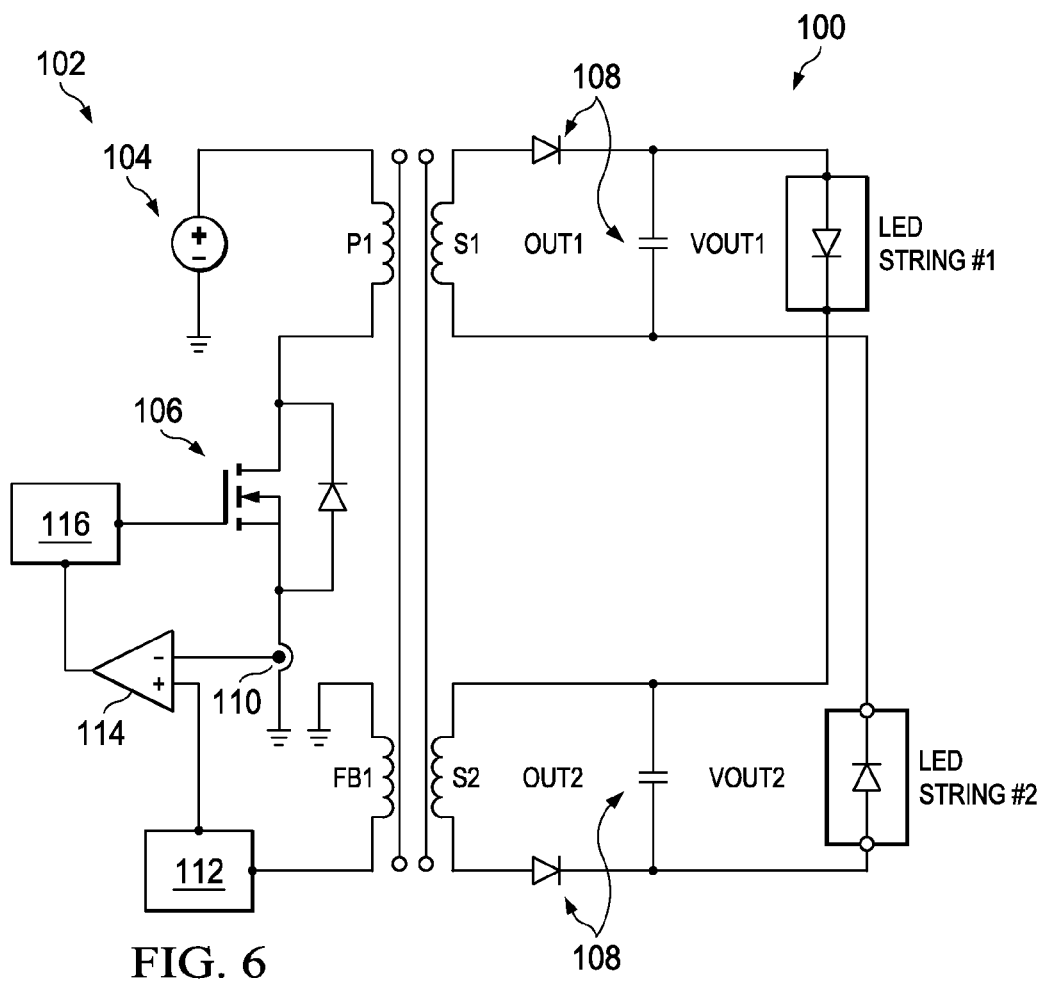
FIG. 6 illustrates a representative schematic of a system that employs a single ended flyback converter with indirect current regulation for providing a substantially constant and equal current to a plurality of LED strings in accordance with an aspect of the present invention.

It is to be appreciated that is may be desirable to further control and regulate the current flowing through the LED strings. This can be accomplished by directly controlling and regulating current flowing through any of the LED strings or indirectly controlling and regulating current flowing through the LED strings by regulating the primary current of the converter. FIG. 5 illustrates one example for directly controlling and regulating current flowing through the LED strings, while FIG. 6 illustrates one example of indirectly controlling and regulating current flowing through the LED strings by regulating the primary current flowing through the converter. It is to be appreciated that FIGS. 5 and 6 are exemplary techniques for controlling and regulating current and a number of direct and indirect techniques could be employed for carrying out the invention.

FIG. 5 illustrates a representative schematic of a system 80 that employs a single ended flyback converter 82 with direct current regulation for providing a substantially constant and equal current to a plurality of LED strings in accordance with an aspect of the present invention. The single end converter 82 is a dual output current regulated flyback converter that includes a primary winding (P1) coupled between a voltage source 84 and a switching device 86 to provide an AC voltage and an AC regulated current to the primary winding (P1). The primary winding (P1) drives a first winding (S1) and a second winding (S2) with each of the secondary windings being coupled to a respective diode and capacitor configuration 88 to provide a DC output voltage and DC regulated current to a first LED string (LED STRING #1) and a second LED string (LED STRING #2), respectively. First and second DC output voltages (VOUT1, VOUT2) and first and second LED strings are arranged in a single current loop configuration as previously discussed.

The current in the second LED string is sensed by a current sensing means 90 and applied to an error amplifier 94 which amplifies the difference between the measured current and a current reference 92. The current sensing means 90 could be a variety of different current sensing structures (e.g., resistive coupled structure, inductive coupled structure, etc.) as known to those skilled in the art. The output of the error amplifier 94 drives a modulator 96 which modulates the duty cycle of a switching transistor 86 in order to minimize/nullify the error and regulate current through the first and second LED strings.

FIG. 6 illustrates a representative schematic of a system 100 that employs a single ended flyback converter 102 with indirect current regulation for providing a substantially constant and equal current to a plurality of LED strings in accordance with an aspect of the present invention. The single ended converter 102 is a dual output current regulated flyback converter that includes a primary winding (P1) coupled between a voltage source 104 and a switching device 106 to provide an AC voltage and an AC regulated current to the primary winding (P1). Similarly as discussed with respect to FIG. 5, the primary winding (P1) drives a first secondary winding (S1) and a second secondary winding (S2) with each of the secondary windings being coupled to a respective diode and capacitor configuration 108 to provide a DC output voltage (VOUT1, VOUT2) and DC regulated current to a first LED string (LED STRING #1) and a second LED string (LED STRING #2), respectively. The first and second DC output voltages (VOUT1, VOUT2) and the first and second LED strings are arranged in a single current loop configuration as previously discussed.

A current sense means 110 senses the primary current of the converter 102. Reference generator 112 generates a reference that is a function of the input voltage 104 of the converter 102 and the total voltage of the LED strings from the information provided by a feedback winding FB1 of the Flyback converter 102. During the on-time of transistor switch 106 the voltage across the feedback winding FB1 is proportional to the input voltage 104 and during the off time of the transistor switch 106 the voltage is proportional to the total voltage on the LED strings. An error amplifier 114 compares the primary current with a reference generated by the reference generator 112. The output of the error amplifier 114 drives a modulator 116 which modulates the duty cycle of the power transistor 106 in order to minimize/nullify the error and regulate current through the first and second LED strings. The reference generator 112 can implement algorithms that create a reference for the primary current that produces a current in the LEDs that is independent of variations in input voltage or in the voltages of the LEDs.

It is to be appreciated that controlling the LEDs current according to the above examples is not limited to Flyback converters or two LEDs strings and the same control architecture can be applied to any converter topology, using either half or full wave rectification to provide current drive for any number of LEDs strings In some applications employing a large number of LED strings, the number of the required outputs may require an excessive number of secondary windings. This problem can be solved by using multiple transformers (each with fewer secondaries) with their primary windings connected in series or parallel to create the required number of outputs. FIGS. 7-10 show embodiments of the invention for single and double ended cases with parallel and series connected transformers. Although only two transformers with two outputs each are shown for clarity, extensions to higher numbers will be readily apparent to those skilled in the art. Each of the embodiments of FIGS. 7-10 are arranged in a single current loop configuration as discussed with respect to FIGS. 1-6, such that discussion of the individual parts of the converters have been omitted to eliminate further redundancy.

Figure 8:
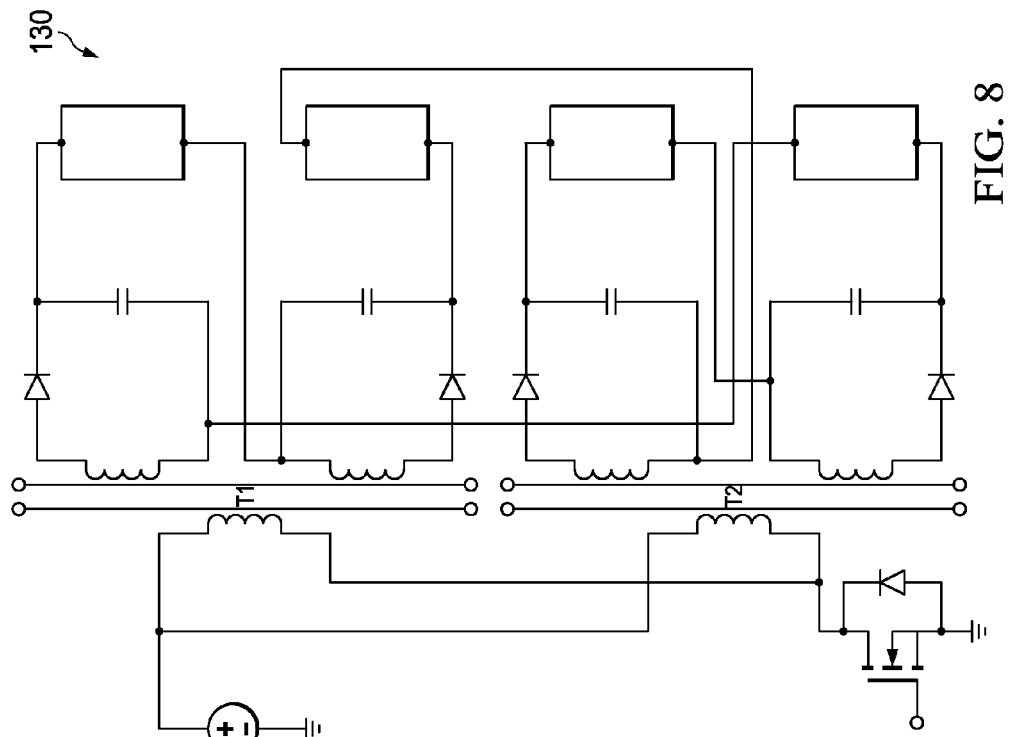
FIG. 8 illustrates a representative schematic of a system that employs a single ended converter with series connected transformers for providing a substantially constant and equal current to a plurality of LED strings in accordance with an aspect of the present invention.
Figure 7:
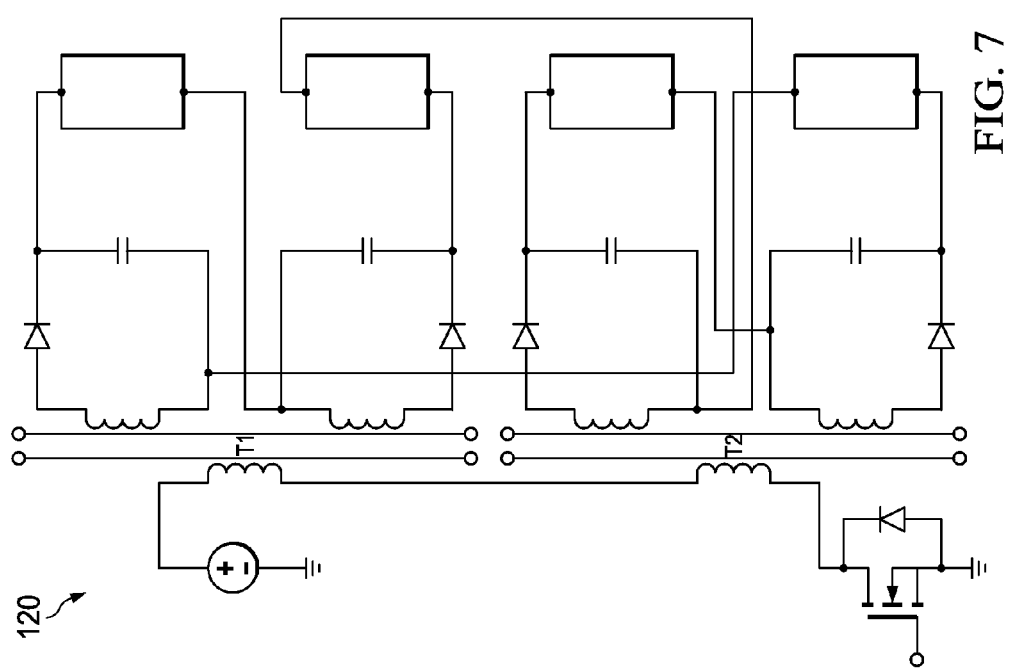
FIG. 7 illustrates a representative schematic of a system that employs a single ended converter with parallel connected transformers for providing a substantially constant and equal current to a plurality of LED strings in accordance with an aspect of the present invention.
Figure 10:
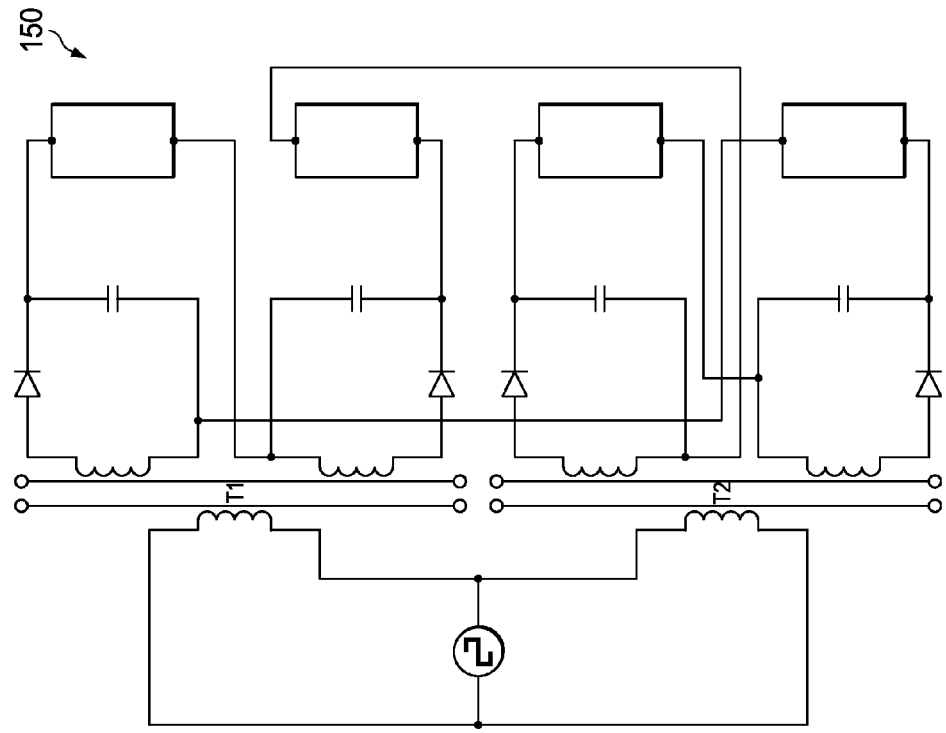
FIG. 10 illustrates a representative schematic of a system that employs a double ended converter with parallel connected transformers for providing a substantially constant and equal current to a plurality of LED strings in accordance with an aspect of the present invention.
Figure 9:
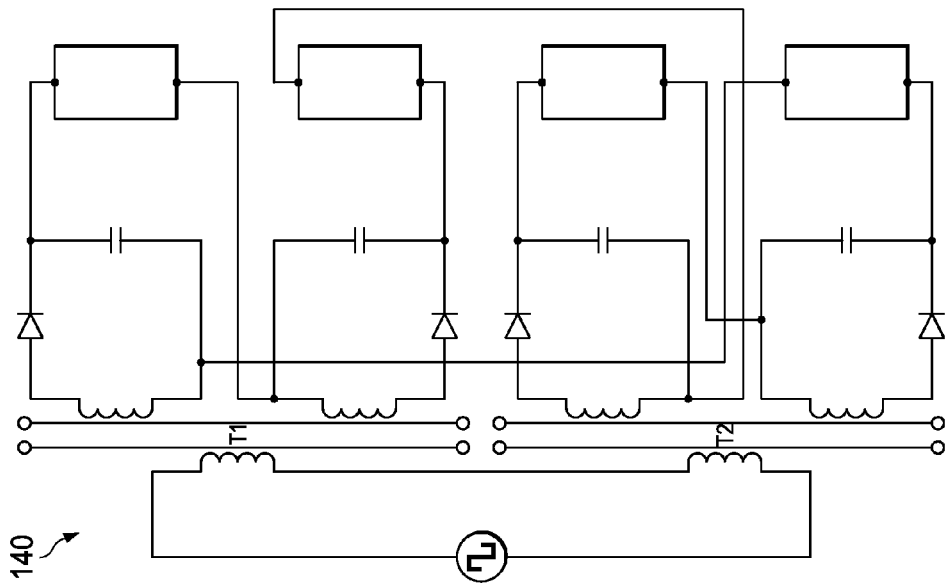
FIG. 9 illustrates a representative schematic of a system that employs a double ended converter with series connected transformers for providing a substantially constant and equal current to a plurality of LED strings in accordance with an aspect of the present invention.

FIG. 7 illustrates a representative schematic of a system 120 that employs a single ended converter with parallel connected transformers for providing a substantially constant and equal current to a plurality of LED strings in accordance with an aspect of the present invention. FIG. 8 illustrates a representative schematic of a system 130 that employs a single ended converter with series connected transformers for providing a substantially constant and equal current to a plurality of LED strings in accordance with an aspect of the present invention. FIG. 9 illustrates a representative schematic of a system 140 that employs a double ended converter with series connected transformers for providing a substantially constant and equal current to a plurality of LED strings in accordance with an aspect of the present invention. FIG. 10 illustrates a representative schematic of a system 150 that employs a double ended converter with parallel connected transformers for providing a substantially constant and equal current to a plurality of LED strings in accordance with an aspect of the present invention.

Figure 11:
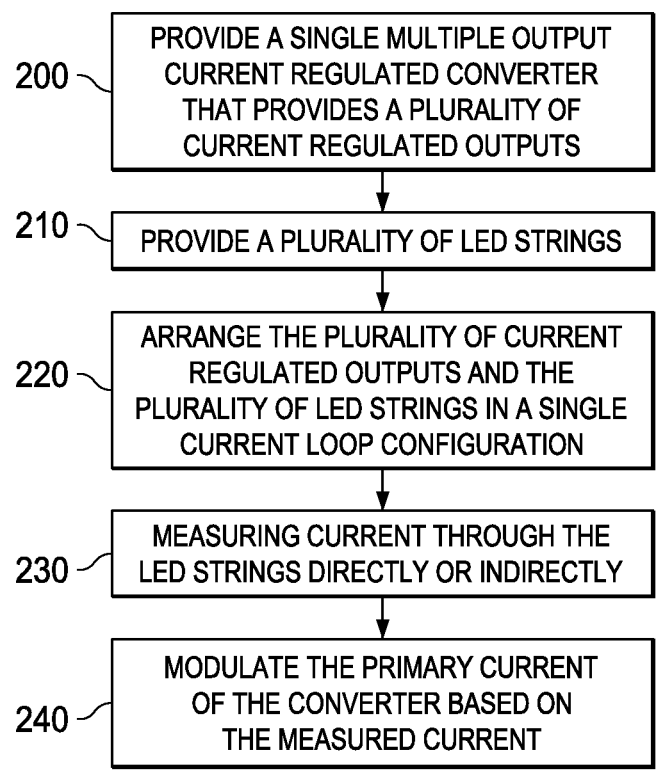
FIG. 11 illustrates a methodology for providing a substantially constant and equal current to a plurality of current driven loads in accordance with an aspect of the invention.

In view of the foregoing structural and functional features described above, a methodology will be better appreciated with reference to FIG. 11. It is to be understood and appreciated that the illustrated actions, in other embodiments, may occur in different orders and/or concurrently with other actions. Moreover, not all illustrated features may be required to implement a method.

FIG. 11 illustrates a methodology for providing a substantially constant and equal current to a plurality of current driven loads in accordance with an aspect of the present invention. The methodology begins at 100 where a single multiple output converter is provided that includes a plurality of current regulated outputs. At 110, a plurality of LED strings are provided. At 120, the plurality of current regulated outputs and the plurality of LED strings are arranged in a single current loop configuration. At 140 current through the plurality of LED strings is measured directly or indirectly. At 150, the primary current of the converter is modulated based on the measured current to control and regulate the current through the plurality of LED strings.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system comprising:
a plurality of current regulated outputs; and
a plurality of current driven loads, wherein the plurality of current regulated outputs and the plurality of current driven loads are arranged in a single current loop configuration with a respective current regulated output providing an output voltage to a respective current driven load of the plurality of current driven loads, wherein a positive terminal of a first current regulated output is coupled to an anode of a first LED string with a cathode of the first LED string coupled to a negative terminal of a second current regulated output, which is repeated for N current regulated outputs and N LED strings, where N is an integer greater than one, and a cathode of the Nth LED string is coupled to a negative input terminal of the first current regulated output to complete the single current loop configuration.

2. The system of claim 1, wherein the plurality of current driven loads comprises a plurality of light emitting diode (LED) strings.

3. The system of claim 1, wherein the plurality of current regulated outputs are provided by a single multiple output current regulated converter.

4. The system of claim 3, wherein the single multiple output current regulated converter is a single ended converter.

5. The system of claim 3, further comprising means for measuring current flowing through the current driven loads and a modulator for modulating a primary current of the converter employing the measured current through the current driven loads to control and regulate the current flowing through the current driven loads.

6. The system of claim 3, further comprising means for measuring current flowing through a primary winding of the converter and a modulator for modulating the primary current through the winding employing the measured primary current to control and regulate the current flowing through the current driven loads.

7. The system of claim 3, wherein the convert comprises a plurality of primary windings coupled in series or coupled in parallel, each of the series coupled windings being coupled to a plurality of secondary windings.

8. The system of claim 3, wherein the single multiple output current regulated converter is a double ended converter.

9. The system of claim 8, further comprising a plurality of full wave bridge rectifiers, each output of the double ended converter being coupled to a given full wave bridge rectifier of the plurality of full wave bridge rectifiers to provide the double ended converter with full wave rectification.

10. A system for providing a substantially constant and equal current to a plurality of current driven loads, the system comprising:
a single multiple output current regulated converter that provides a plurality of current regulated outputs; and
a plurality of light emitting diode (LED) strings, wherein the plurality of LED strings and the plurality of current regulated outputs are arranged in a single current loop configuration with a respective current regulated output providing an output voltage to a respective LED string of the plurality of LED strings, wherein a positive terminal of a first current regulated output is coupled to an anode of a first LED string with a cathode of the first LED string coupled to a negative terminal of a second current regulated output, which is repeated for N current regulated outputs and N LED strings, where N is an integer greater than one, and a cathode of the Nth LED string is coupled to a negative input terminal of the first current regulated output to complete the single current loop configuration.

11. The system of claim 10, wherein the single multiple output current regulated converter is a single ended converter or a double ended converter.

12. The system of claim 10, wherein the single multiple output current regulated converter is a double ended converter and further comprises a plurality of full wave bridge rectifiers, each output of the double ended converter being coupled to a given full wave bridge rectifier of the plurality of full wave bridge rectifiers to provide the double ended converter with full wave rectification.

13. The system of claim 10, wherein the converter further comprises:
a primary winding coupled between a voltage source and a switch;
means for measuring current flowing through the primary winding of the converter;
a reference generator that generates a reference that is a function of an input voltage of the converter and a total voltage of the plurality of LED strings from information provided by a feedback winding of the converter to the reference generator, wherein during an on time of the switch the voltage across the feedback winding is proportional to the input voltage and during the off time of the switch the voltage across the feedback winding is proportional to the total voltage on the plurality of LED strings;
an amplifier that amplifies a difference between the measured current and the reference; and
a modulator that is driven by the error amplifier and modulates the switch to modulate the primary current of the converter to control and regulate the current flowing through the plurality of LED strings.

14. The system of claim 10, further comprising:
means for measuring current flowing through the LED strings;
an amplifier that amplifies a difference between the measured current and a current reference; and
a modulator that is driven by the error amplifier and modulates a primary current of the converter employing the amplified difference to control and regulate the current flowing through the plurality of LED strings.

15. The system of claim 10, wherein the converter comprises a plurality of primary windings coupled in series or coupled in parallel, each of the coupled windings being coupled to a plurality of secondary windings.

16. A method for providing a substantially constant and equal current to a plurality of current driven loads, the method comprising:
providing a single multiple output current regulated converter that provides a plurality of current regulated outputs;
providing a plurality of light emitting diode (LED) strings; and
arranging the plurality of current regulated outputs and the plurality of LED strings in a single current loop configuration with a respective current regulated output providing an output voltage to a respective LED string;
measuring current flowing through the LED strings;
determining a difference between the measured current and a current reference; and
modulating a primary current of the converter employing the difference to control and regulate the current flowing through the plurality of LED strings.

17. A method for providing a substantially constant and equal current to a plurality of current driven loads, the method comprising:
providing a single multiple output current regulated converter that provides a plurality of current regulated outputs;
providing a plurality of light emitting diode (LED) strings; and
arranging the plurality of current regulated outputs and the plurality of LED strings in a single current loop configuration with a respective current regulated output providing an output voltage to a respective LED string,
further comprising:
measuring current flowing through a primary current of the converter;
determining a difference between the measured current and a current reference; and
modulating the primary current of the converter employing the difference to control and regulate the current flowing through the plurality of LED strings.

18. A system comprising:
a plurality of current regulated outputs; and
a plurality of current driven loads, wherein the plurality of current regulated outputs and the plurality of current driven loads are arranged in a single current loop configuration with a respective current regulated output providing an output voltage to a respective current driven load of the plurality of current driven loads, wherein a positive terminal of a first current regulated output is coupled to a positive terminal of the first load with a negative terminal of the first load being coupled to a negative terminal of a second current regulated output, which is repeated for N current regulated outputs and N loads, where N is an integer greater than one, and a negative terminal of the Nth load being coupled to a negative input terminal of the first current regulated output to complete the single current loop configuration.

* * * * *